INVENTOR
L. C. TILLOTSON
BY
H. O. Wright
ATTORNEY

INVENTOR
L. C. TILLOTSON
BY
H. O. Wright
ATTORNEY

INVENTOR
L.C. TILLOTSON
BY
H. O. Wright
ATTORNEY

INVENTOR
L. C. TILLOTSON
BY H. O. Wright
ATTORNEY

United States Patent Office 2,724,806

Patented Nov. 22, 1955

2,724,806

ELECTROMAGNETIC WAVE HYBRID JUNCTION COAXIAL TRANSMISSION LINE STRUCTURES

Le Roy C. Tillotson, Shrewsbury, N. J., assignor to Bell Telephone Laboratories, Incorporated, New York, N. Y., a corporation of New York Application March 28, 1951, Serial No. 217,968

4 Claims. (Cl. 333—73)

This invention relates to electromagnetic wave, microwave frequency, wave filters, equalizers and "pseudohybrid" junctions employing structures which are formed primarily from coaxial transmission line components.

Many of the specific illustrative embodiments of the present invention described in detail below and illustrated in the accompanying drawings, are the coaxial transmission line structural counterparts of electromagnetic wave wave-guide devices disclosed and claimed in the copending application of W. D. Lewis Serial No. 120,142, filed October 7, 1949, and assigned to applicant's assignee. This application matured into United States Patent 2,649,576 granted August 18, 1953. Related structures are also disclosed and claimed in the copending application of D. H. Ring Serial No. 68,361 filed December 30, 1948 and assigned to applicant's assignee. This application matured into United States Patent 2,633,492 granted March 31, 1953. All pertinent parts of the disclosures of the above-mentioned two copending applications are, accordingly, incorporated in the present application and made a part thereof, by reference. Particularly, the definition and explanation of the new term "pseudohybrid" as given in detail in the above-mentioned Lewis application is adopted in the present application.

Since coaxial transmission line structures can generally be readily constructed for use over a broad band of frequencies extending from and including the higher frequencies at which "lumped-element" structures are feasible to construct, to and including a substantial portion of the lower end of the frequency range over which electromagnetic wave wave-guide structures of practicable physical dimensions can be conveniently constructed, the provision of the coaxial transmission line structures of the present invention represents a valuable and substantial contribution to the art. In other words, the useful frequency range over which coaxial transmission line structures can, as a feasible and practicable matter, be used, substantially overlaps (or extends into) both the "lumped-element" range and the wave-guide range, in addition to including the intermediate frequency range which is too high for practicable "lumped-element" structures and too low for practicable wave-guide structures.

A principal object of the invention is, therefore, to provide structures composed principally of coaxial line elements which will have, particularly in and adjacent to the frequency range intermediate to the feasible "lumped-element" and wave-guide frequency ranges, the characteristics of electromagnetic wave filters, equalizers and hybrid junctions.

Other and further objects will become apparent during the following detailed description of specific illustrative embodiments of various principles of the invention as well as from the appended claims.

The principles of the invention will be more readily understood in connection with the following description and the accompanying drawings in which.

Figure 1:
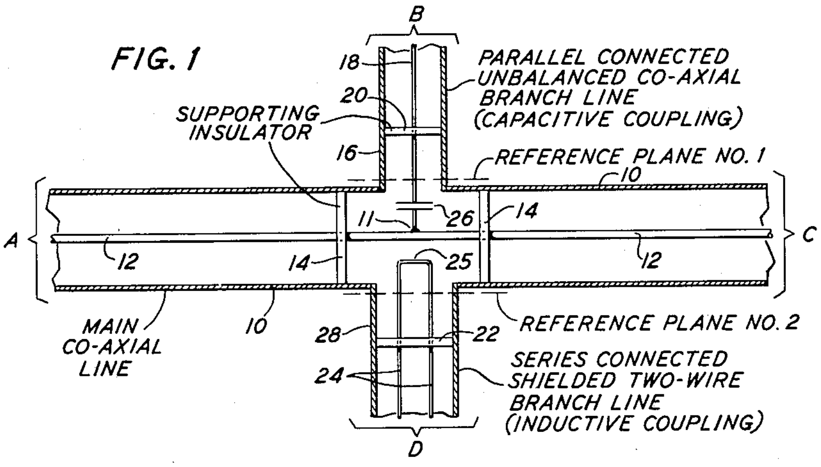
Fig. 1 shows, in semischematic diagram form, a basic coaxial transmission line structure of the invention having the characteristics of an electromagnetic wave, microwave frequency, pseudohybrid junction.

In more detail, in Fig. 1 a section of a main coaxial line 10, having an inner conductor 12, centrally supported with respect to the outer conductor by supporting insulators 14 is shown. Symmetrically about a plane perpendicular to the plane of the paper and including the point 11 along the section of main coaxial line 10, as shown in Fig. 1, two branch arms 16, 18 and 24, 28 are electrically coupled to the main coaxial line as will be described in detail below.

Branch arm 16 is a second section of coaxial line having an inner conductor 18 centrally supported with respect to the outer conductor by insulator 20.

Center conductor 18 is connected to capacitor 26, the opposite terminal of which capacitor is connected at point 11 to the center conductor 12 of the main coaxial line 10, as shown.

Branch arm 28 has within its outer conductor a two-conductor balanced line 24 symmetrically supported within the outer conductor by insulator 22, as shown. The upper end of balanced line 24 is closed and inductively coupled to center conductor 12 of the main coaxial line, by conductor 25, which for a relatively small or weak coupling can be straight, as shown. For increased, but still relatively small or weak, coupling, conductor 25 can be a loop, or, as will presently be described, even a coil, encircling, the center conductor. Whatever form this inductive coupling loop, or element, is given, its effective coupling to the main coaxial line should be symmetrical (i. e., balanced) with respect to the point 11.

As is apparent to those skilled in the art, the coupling by means of capacitor 26 constitutes a parallel coupling between the two ends A and C of the main coaxial line 10 and the coaxial line 16 (terminal B). Likewise, the inductive coupling afforded by loop 25 described above effectively connects the two-conductor line 24 in series with the terminals A and C of the main sections of coaxial line 10.

The above relations are apparent since, if we assume a source connected to terminal B of coaxial branch line 16 and suitable terminations connected to terminals A and C of the main coaxial line 10, then currents of equal amplitude and the same phase will flow from the source through the capacity coupling afforded by capacitor 26 to the terminations at terminals A and C. No net voltage will be induced in the inductive coupling afforded by conductor or loop 25 since it is symmetrical with respect to point 11, as described above and therefore the flux linking one half thereof will be exactly equal and opposite in direction to that linking the other half. The capacitively coupled connection is, therefore, clearly a parallel connection which is isolated by balance from the inductively coupled connection.

On the other hand, if we assume a balanced source, the center point of which is grounded (or connected to the outer conductor 28), to be connected to the lower end of the two-wire line 24, and terminals A and C to be terminated as described above, currents of equal amplitude and opposite phase will flow to the terminals A and C. Since the voltage to ground measured at the center point of the coupling element 25 will be zero, no current will flow into the parallel connected arm 16, 18 and it is thus also isolated by balance from the series connection afforded by coupling conductor 25 and its associated arm.

The arrangement shown in Fig. 1, as described above, then comprises a main section of transmission line, to which both a series connection and a parallel connection have been made, said connections being mutually isolated from each other and symmetrical about the same transverse plane. The structure is obviously, therefore, the coaxial line equivalent of the wave-guide pseudohybrid structures disclosed and claimed in the above-mentioned copending application of W. D. Lewis, particularly the structure of Fig. 1 of the Lewis application. In a more restricted sense, it is a coaxial line structure, which is equivalent, except for the weak or small couplings of the series and parallel connected arms, to the wave-guide hybrid junction or the four terminal wave-guide hybrid ring and related structures disclosed, for example, in the above-mentioned application of D. H. Ring.

Figure 3:
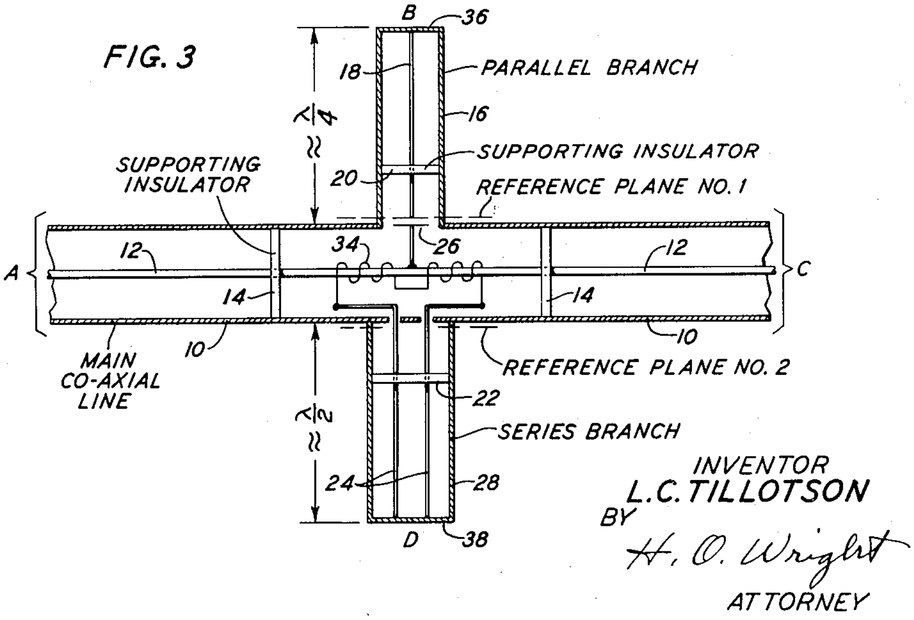
Fig. 3 shows, in semischematic diagram form, a further modification of the general type of structure illustrated in Figs. 1 and 2 which can be proportioned to provide either band rejection wave filter or phase equalizer characteristics.

The dimensions of the main and branch coaxial lines are chosen, in accordance with principles well known to those skilled in the art, to provide the desired impedance level, and to allow only the TEM type of electromagnetic wave to be propagated through the structure over the operating frequency range to be employed. As is well understood in the art, the capacitative coupling is a coupling to the electric field only and the inductive or loop coupling is a coupling to the magnetic field only. The reference planes Nos. 1 and 2 represent the effective locations of the respective coupling impedances of the two branch arms and the equivalent electrical schematic of the over-all device is the same as for the structure of Fig. 1 of the above-mentioned Lewis application as shown in Fig. 3 thereof and explained in detail in the Lewis application.

The coaxial pseudohybrid junction of Fig. 1 of the present application can conveniently and feasibly be constructed of any highly conductive material such as copper or brass. The outer conductor can be a pipe of circular cross section which for use at frequencies in the order of a hundred or so megacycles, by way of example, can have an internal diameter in the order of an inch. The center conductor diameter is, as is well known to those skilled in the art, then selected to provide the desired impedance level. The diameter of the inner conductor is usually in the order of approximately one-quarter of the internal diameter of the outer conductor, though the ratio between the two can be varied over a wide range where impedance or other considerations make particular values of the ratio attractive. The insulating members mentioned above and throughout this specification can, for example, be made of polystyrene, or similar material, in accordance with the usual practices in the art.

For narrow band devices (i. e., for example, filters which are to reflect, or suppress in the filter output, a relatively very narrow band of frequencies) the inductive and capacitative couplings of the branch arms to the main coaxial line are made relatively weak. For devices to operate over broader frequency bands these couplings should be made correspondingly stronger.

For the capacitative coupling, a small capacitor 26 can be used, the capacity of which has been adjusted to afford the desired degree of coupling. For very narrow band devices the prolongation of inner conductor 18, of arm 16, as a probe into coaxial line 10 will be found to provide the required degree of coupling. The length and diameter of "probe" required for such quite weak couplings is frequently best determined by experiment. With some experience as a background, it will be found entirely feasible to obtain the desired degree of coupling with a reasonable amount of effort.

Figure 2:
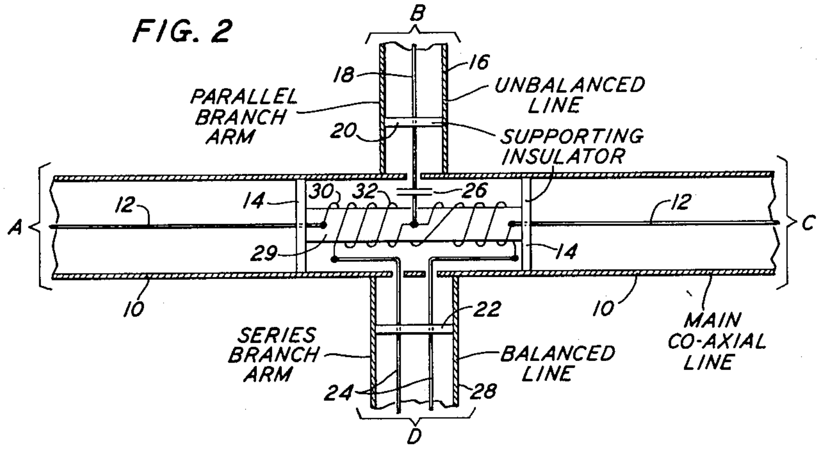
Fig. 2 shows, in a semischematic diagram form, a modification of the structure of Fig. 1.

The inductive coupling can be increased or adjusted in a number of ways which will be apparent to those skilled in the art, particularly in connection with the description of Figs. 2 and 3 given hereinunder, where two of the numerous feasible methods are illustrated by way of example.

The structure of Fig. 2 of the present application is, as indicated by the preponderance of like parts bearing corresponding designation numbers to parts of Fig. 1, a slight modification of the device of Fig. 1. The sole distinction is that the coupling to branch arm 28 is increased by insertion of an insulating mandrel 29 around which the portion 30 of inner conductor 12 between insulators 14, is wound in interleaved relation with coil 32 on the mandrel 29 which coil 32 replaces the simple conductor or loop element 25 of Fig. 1. This arrangement obviously provides a greater degree of inductive coupling between the balanced line 24 of branch arm 28 and the main coaxial line 10.

The structure of Fig. 3 is, with respect to the inductive coupling feature, a compromise between the structures of Figs. 1 and 2 in that loop 34 is coiled around the inner conductor 12 of the main coaxial line but inner conductor 12 is not formed into a coil as it is in Fig. 2. The forms of inductive coupling shown in Figs. 1 to 3, inclusive, obviously, provide for adjustment of this coupling to any of a wide range of values. Obviously too, the capacitative coupling afforded by capacitor 26 can be varied over a wide range of values by the simple expedients mentioned in detail above.

Fig. 3, further, illustrates how a band rejection (or band elimination) filter, or alternatively a phase equalizer, can be constructed by simple modification of the basic coaxial structure illustrated in Figs. 1 to 3, inclusive.

Figure 4:
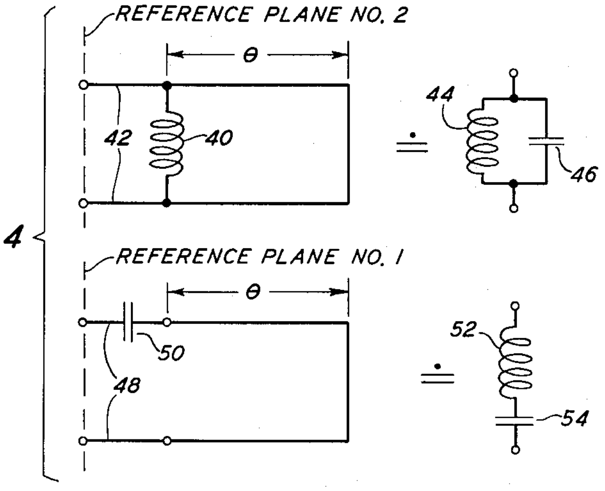
Fig. 4 illustrates the equivalence between two types of transmission line resonators, suitable for use in the arrangement of Fig. 3, and "lumped-element" or coil and condenser combinations.

If the parallel connected branch arm 16 is closed and electrically short circuited by a conductive member 36, at a distance of approximately one-quarter wavelength of the median frequency of the band to be reflected and the series connected branch arm 28 is also closed and electrically short circuited by a conductive member 38 at a distance of approximately one-half wavelength of said median frequency, then the electrically equivalent "lumped-element" circuits for the branch arms are those shown in Fig. 4.

In Fig. 4 the inductively coupled branch arm is shown to be substantially equivalent to a parallel resonant circuit comprising an inductance 44 shunted by a capacitor 46 and the capacitatively coupled branch arm is shown to be substantially equivalent to a series resonant circuit comprising an inductance 52 in series with a capacity 54. As is well known to those skilled in the art, any number of half wavelength sections can be added to either or both of these arms without interfering with the operation of the device as described.

For the inductively coupled arm $$\sqrt{\frac{C}{L}}=(1+b^2)\left(\frac{\pi}{2}-\frac{\varphi_0}{2}\right) \qquad (1)$$

where $$\varphi_0=\cot^{-1}|b| \text{ and } \theta_0=(\pi-\varphi_0)$$

For the capacitatively coupled arm $$\sqrt{\frac{L}{C}}=(1+x^2)\left(\frac{\pi}{2}-\frac{\varphi_0}{2}\right) \quad (2)$$

where $$\varphi_0=\cot^{-1}|x| \text{ and } \theta_0=\left(\frac{\pi}{2}-\varphi_0\right)$$

The basic theory and the concepts underlying the various types of filters and equalizers employing microwave hybrid and pseudohybrid wave-guide structures are analyzed and explained in detail in the above-mentioned application of W D. Lewis, Serial No. 120,142, filed October 7, 1949, by way of example, see particularly pages 9 to 29, inclusive thereof, starting at the heading "The Hybrid Junction" on page 9 and ending at the heading "Four Resonance Pseudohybrid Band-Pass Filter" on page 29. The same principles are directly applicable to the theory and the concepts underlying the coaxial structures of the present application, as will be immediately apparent to those skilled in the art. For filters having a "maximally flat" response throughout the transmitted band of frequencies, see particularly the table on page 17 of the above-mentioned Lewis application.

As taught in the above-mentioned applications of D. H. Ring and W. D. Lewis a hybrid structure with two conjugately related arms terminated in highly reactive resonators is the microwave equivalent of the low-frequency, "lumped-element," lattice structure and the selectivity of the resonators can therefor be specified by any of the several methods well known to those skilled in the art. By way of example, see the article entitled "Synthesis of Reactance 4-poles" by S. Darlington, published in the Journal of Mathematics and Physics (Massachusetts Institute of Technology) Vol. XVIII, No. 4, pages 257 to 353, for September 1939.

With the information given in connection with Fig. 4 of the accompanying drawings and the Equations 1 and 2, described above, the required series and parallel arm couplings can be realized as described above.

If the two resonators of Fig. 3, described above, have the same resonant frequency and the same effective selectivity, the structure of Fig. 3 will be an all-pass or delay network, whose over-all delay will be the sum of the delay in the two branch arms, as described in detail in the above-mentioned Lewis application. Such structures are also known to those skilled in the art as "phase-equalizers."

The performance of the structure can be visualized in the following manner. If at first the frequency applied is far removed from the common resonance frequency of the two arms, the relatively small couplings of the branch arms to the main arm will be virtually ineffective and the wave will travel along the main coaxial line in substantially the same manner as though the branch arms were not coupled thereto. As the frequency of the wave traveling along the main coaxial is made more nearly the same as the resonance frequency of the branch arm resonators, however, the couplings will begin to pick up an appreciable amount of energy and waves will travel out the branch arms, where they will be completely reflected since these branches are purely reactive (or substantially so). This condition will prevail until the frequency of the wave on the main coaxial has passed through the resonance frequency of the branch arm resonators and beyond it in the opposite direction, assuming a continuous variation of frequency from a point well above (or below) resonance to a point well below (or above) resonance. Since the branch arms are substantially identical the reflected components of the waves from the two arms will be returned to the main coaxial in phase with respect to the output end of the main coaxial and will be out of phase (or cancel each other) with respect to the input end of the main coaxial, and the change in phase at the output end of the main coaxial, resulting from travel down the branch arms and back again will be equal to the sum of the delays of the branch arms at each frequency. This performance is the equivalent of using a fixed frequency and varying the lengths of the two branch arms simultaneously and in like manner about a length at which the branch arms are resonant at the fixed frequency, ($\frac{1}{2}\lambda_f$) as might be done, for example, by moving short circuiting plungers simultaneously along the two branch arms so that they are always of equal effective length.

If the branch arms are made resonant at different frequencies a band rejection filter will be obtained since at some particular frequency between the two selected frequencies of branch arm resonance, the reflected components will be precisely out of phase with respect to the output end of the main coaxial and complete reflection of that frequency back to the input end will take place. At frequencies relatively remote from the resonant frequencies, however, the branch arms will have no effect on transmission along the main coaxial line.

*Coaxial band-pass filter*

Figure 5:
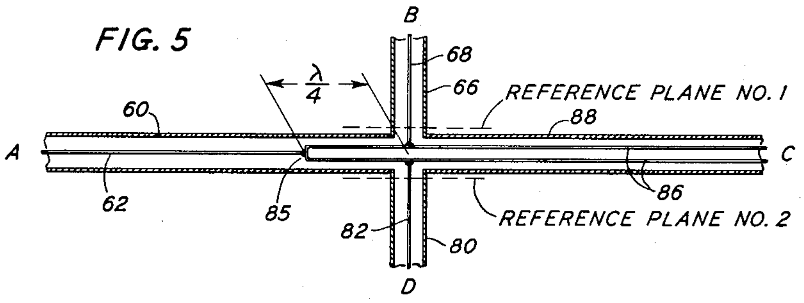
Fig. 5 shows, in diagrammatic form a modified type of coaxial, electromagnetic wave, hybrid structure.

In order to obtain a band-pass filter characteristic with a structure comprising principally coaxial line components, it is necessary to resort to an arrangement such as that shown, by way of example, in Fig. 5.

In Fig. 5, the main line starts at the left end (terminal A) as a coaxial line comprising an outer conductor 60 and an inner conductor 62. At a point one-quarter wavelength, of the median frequency of the band to be passed by the structure, to the left of the junction plane of the branch arms (terminals B and D) the inner conductor 62 is terminated in a two-wire balanced line 86, which extends from its point of juncture with conductor 62 to the right end (terminal C) of the structure. It should be noted that, electrically, terminal C comprises the two right ends of the balanced line 86, member 88 being only an electrical shield at this terminal. The left end of line 86 is short circuited by member 85 as shown, the midpoint of the short circuiting member 85 being connected to the right end of conductor 62. The two branch arms (B and D) comprise like sections of coaxial line, consisting of outer conductors 66 and 80 and inner conductors 68 and 82, respectively, as shown. The inner conductors 68 and 82 are connected to the upper and the lower conductors of balanced line 86, respectively, at a distance of one-quarter wavelength from shorting member 85, as described above. Shield 88 encloses the right end of line 86 and is in essence a continuation of outer conductor 60, mentioned above.

In the frequency region in which the distance from member 85 to the above-described junction points of conductors 68 and 82 is exactly, or relatively close to, one-quarter wavelength, the section of the line 86 to the left of said junction points has a very high impedance. The terminal C of balanced line 86 is, therefore, in this frequency region, effectively in series with branch arms B and D and terminal A is in parallel with them. Also the arms A and C are isolated from each other by electrical balance. The over-all structure of Fig. 5 is therefore, in the above-mentioned frequency range, an electromagnetic wave, high frequency, hybrid structure.

Figures 6, 7:
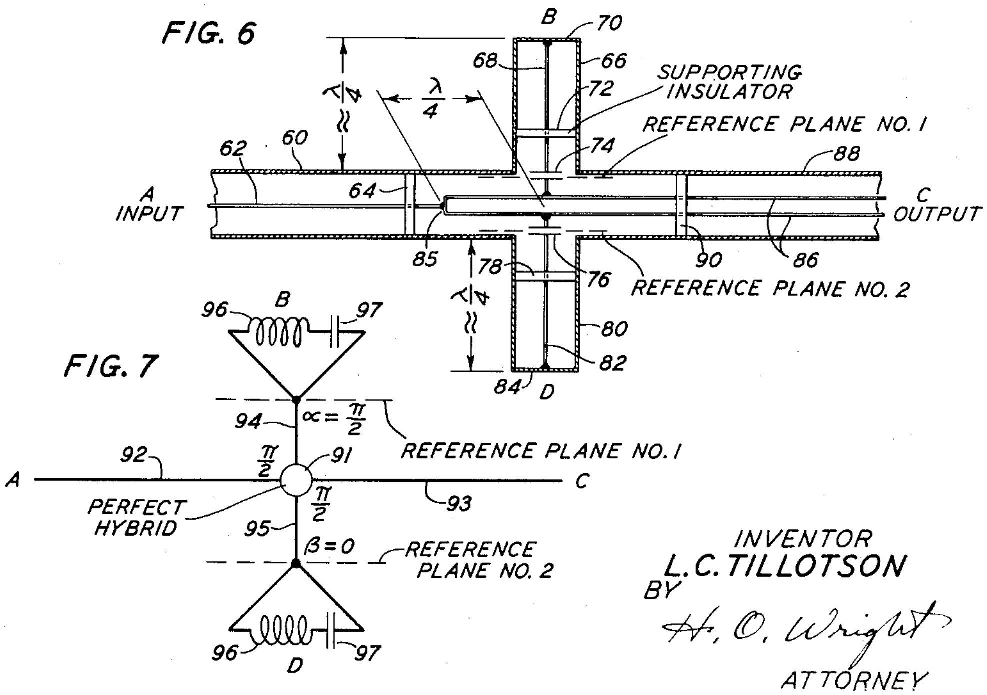
Fig. 6 shows, in diagrammatic form a modified type of coaxial, electromagnetic wave, pseudohybrid, band-pass wave filter.
Fig. 7 is a schematic diagram employed in explaining the wave filter of Fig. 6.

As shown in Fig. 6, the branch arms B and D can be loosely coupled to the line 86 by inserting coupling capacitors 74 and 76 to connect inner conductors 68 and 82 to the upper and lower conductors of line 86, respectively, as shown. Insulators 64, 72, 78 and 90 support the inner conductors of their respective coaxial lines as described above for the similar insulators of Figs. 1 to 3, inclusive. Also, the branch arms B and D of Fig. 6 are shortened at their outer ends by members 70 and 84, respectively. These arms B and D are proportioned, in length, to be resonant at the mid-band frequency of the band to be passed by the filter.

An electrical schematic diagram of the band-pass filter of Fig. 6 is shown in Fig. 7.

In Fig. 7, circle 91 represents the hybrid junction with arms 92 and 93 corresponding to the coaxial line 60, 62 and the balanced line with shield 86, 88, respectively. Arms B (94) and D (95) are, of course, the lines 66, 68 and 80, 82, respectively, of Fig. 6, short circuited at their outer ends, their resonant properties being represented schematically by the series resonant coil and condenser combination 96, 97. Reference planes Nos. 1 and 2 represent the positions at which capacitors 74 and 76, loosely couple the arms electrically to the hybrid junction. The width of the band passed by the structure as a band-pass filter is dependent upon the "Q" or electrical efficiency of the arms and the degree of electrical coupling afforded by the capacitors 74 and 76, as is well understood by those skilled in the art. The greater the degree of electrical coupling, the wider is the band of frequencies passed from terminal A to terminal C. At frequencies remote from the resonant frequency of the branch arms B and D there is, of course, substantially no transfer of energy from terminal A to terminal C.

Figure 8:
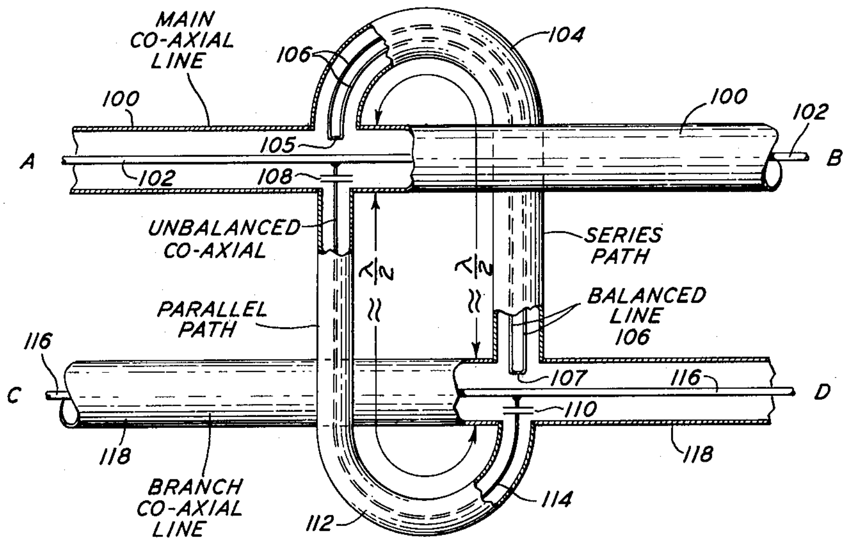
Fig. 8 shows in diagrammatic form a type of electromagnetic wave, coaxial, constant resistance, pseudohybrid, filter.

Fig. 8 is a coaxial filter structure for "dropping a channel," i. e., for segregating one band of frequencies from a coaxial line along which a plurality of frequency bands are being transmitted, the dropped or segregated band being transmitted to a second or branch coaxial line. It is representative of a number of coaxial line structures which are the coaxial line counterparts of the wave-guide structure performing the above-described function as disclosed in the above-mentioned copending application of W. D. Lewis. The specific illustrative wave-guide structures of the Lewis application are those shown in Figs. 16, 17 and 19 of the drawings accompanying the Lewis application and the equivalent electrical schematic diagram of the wave-guide structure of the Lewis application is shown in his Fig. 18. The same electrical schematic diagram (i. e., Lewis' Fig. 18) is equally applicable to the corresponding coaxial structures such as that represented by Fig. 8 of this present application.

In Fig. 8, the main coaxial line comprising outer conductor 100 and inner conductor 102, can be, by way of example, the main long-distance transmission link over which five channels, each 100 kilocycles wide occupying the total frequency region between 449 and 451 megacycles is being transmitted.

The channel dropping filter of Fig. 8 can, by way of example, be located at a systems terminal point or some intermediate (repeater) point along the main transmission line at which it is desired to drop or segregate one channel or frequency band, such as the 100 kilocycle band centered about 450 megacycles, for example, without interfering with the transmission of the remainder of the channels or frequency bands along the main coaxial line.

Branch coaxial line, comprising outer conductor 118 and inner conductor 116, is to receive the dropped or branched channel, above-mentioned, and, by way of example, to convey it to terminal or sub-terminal equipment. To effect this desired result, the main and branch coaxial lines are interconnected by the two arms, one of which comprises the loop of coaxial line having outer conductor 112 and inner conductor 114 and the other of which comprises the loop of balanced two-wire line 106 and a tubular shield 104 enclosing said last-mentioned line.

Capacitors 108 and 110 serve to loosely couple the upper and lower ends of loop 112, 114, to the main and branch coaxial lines, respectively, as shown.

Conductors 105 and 107 which join the upper ends and lower ends of the balanced two-wire pair 106, respectively, constitute, with the ends of said pair, coupling loops affording loose electrical inductive couplings to the main and branch coaxial lines, respectively. The junctions at the main and the branch coaxial lines are obviously identical with that shown in Fig. 1 of the accompanying drawings and described in detail above. The loops 112, 114 and 104, 106 are of equal length and substantially one-half wavelength of the median frequency of the band of frequencies to be branched off to branch coaxial line 116, 118.

Figures 9, 10:
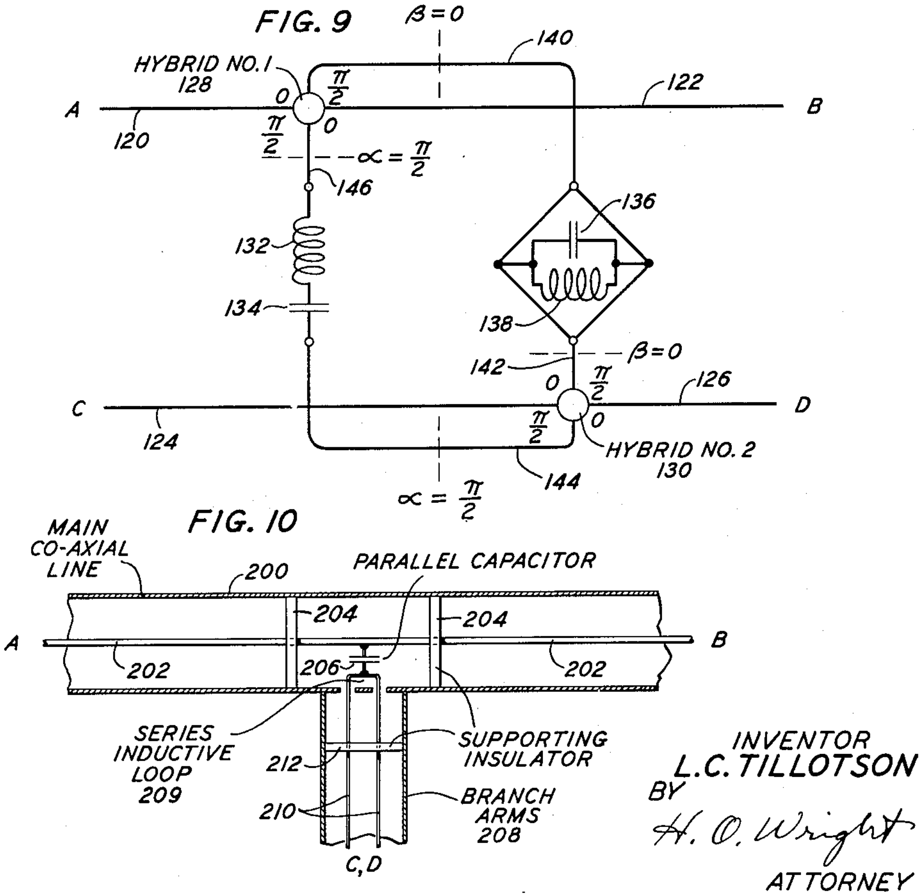
Fig. 9 is a schematic diagram used in explaining the arrangement shown in Fig. 8.
Fig. 10 shows, in diagrammatic form, a two-mode electromagnetic wave, coaxial, pseudohybrid.

The sole difference in electrical equivalence between the structure of Fig. 8 of the present application and the above-mentioned structures of Figs. 16, 17 and 19 of the Lewis application becomes apparent upon consideration of the equivalent electrical schematic diagram of the structure of Fig. 8 as shown in Fig. 9 of the present application.

It is that, whereas in the structures of the Lewis application the two paths or circuits interconnecting the two pseudohybrid devices are identical, in the structure of Fig. 8, as illustrated in Fig. 9, they are actually different but electrically equivalent, as will be apparent from the discussion of the schematic circuit of Fig. 9, given below.

In Fig. 9, input pseudohybrid junction 128 and output pseudohybrid junction 130 have their loosely coupled pair of terminals interconnected by a pair of electrically equivalent arms respectively comprising, for one arm, elements 140, 136, 138, 142 and, for the other arm, elements 144, 134, 132, 146. Elements 140, 136, 138 and 142 collectively correspond to loop 106, 104 of Fig. 8 and elements 144, 134, 132, and 146 collectively correspond to loop 112, 114, of Fig. 8. Lines 120, 122 correspond to the main coaxial line 100, 102 of Fig. 8 and lines 124, 126 correspond to the branch coaxial line 118, 116 of Fig. 8. In view of the relative phase shifts introduced by the several coupling means, two inductive and two capacitative, as described above for the structure of Fig. 8, the required equivalents of the quarter wavelength line sections included in the circuit of the Lewis application Fig. 18 are clearly present in Fig. 9 of this application, and the over-all circuit illustrated by Figs. 8 and 9 of this application is clearly a coaxial line equivalent of the constant resistance branching filter of the generic type illustrated by the wave-guide structure of Lewis' application Figs. 16, 17 and 19.

This is readily demonstrated by the following elementary analysis of the schematic circuit shown in Fig. 9. Assume that a source of a broad band of frequencies, including the narrower band over which the coupling arms 136, 138 and 132, 134 are at or near resonance, is connected to terminal A and that terminals B, C and D are all terminated in impedances which produce substantially no impedance mismatch, the wave energy in the above-described narrower band of frequencies divides equally between arms 140 and 146 at pseudohybrid junction 128 and substantially no energy of this narrower band appears initially at terminal B.

The energy entering the arm 146, experiences a relative phase shift of $\pi$ radians in passing through pseudohybrid 128, a relative phase shift of $\theta_R$ resulting from the resonance of the path including 146, 132, 134 and 144, and $\pi$ radians in passing from 144 to arm C through pseudohybrid 130 and line 124, or $$\frac{\pi}{2}$$

in passing from 144 to arm D through pseudohybrid 130 and line 126.

Therefore, for the energy reaching terminal C as described immediately above, the total phase is $$\varphi_T = \theta_R + 2\pi \quad (3)$$

and for that reaching terminal D, it is $$\varphi_T = \theta_R + \frac{3\pi}{2} \quad (4)$$

In a similar manner, for the energy passing through the arm 140, 136, 138, 142 the total phase at terminal C is $$\varphi_T=\theta_R \qquad (5)$$

and at terminal D it is $$\varphi_T=\theta_R+\frac{\pi}{2} \qquad (6)$$

From Equations 3 to 6, inclusive, above, it is obvious that the two components reaching terminal C will add and those reaching terminal D will cancel so that the band of frequencies passed by the arms between the pseudohybrid will be freely passed to terminal C.

Frequencies of the source connected to terminal A, which are far removed from the resonance frequency of the two arms connecting the main and branch coaxial lines, will not pass through the weak couplings to the branch arms of pseudohybrid junction 128 but will pass undisturbed to terminal B along the main coaxial line (100, 102 of Fig. 8). Frequencies nearer the resonance frequency of the branch arms but not within the band it is intended to pass to the branch coaxial line, may enter the branch arms but will be reflected back by the effective reactances of the arms to the main coaxial line in such relative phase as to proceed on to terminal B in phase. As has already been mentioned above, a comprehensive mathematical analysis of the corresponding wave-guide structures will be found in the above-mentioned Lewis application and is directly applicable to the counterpart structures of the present application.

Figure 11:
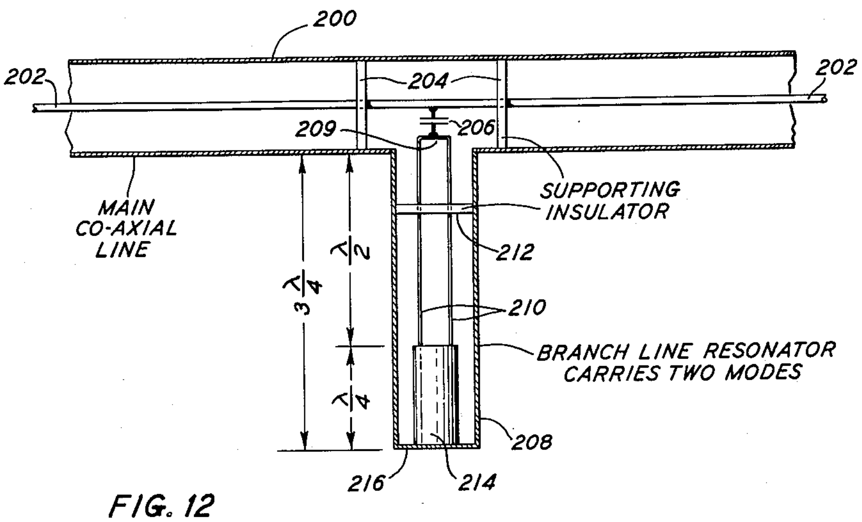
Fig. 11 shows, in diagrammatic form, a band rejection wave filter or delay equalizer employing the structure of Fig. 10.

In Figs. 10 and 11 a still further application of the principles of the present invention is illustrated and takes the form of what can aptly be termed a two-mode or double-mode coaxial pseudohybrid. Fig. 10 illustrates the two-mode coaxial pseudohybrid junction and Fig. 11 illustrates an application of the structure of Fig. 10 in constructing a band rejection filter or a delay equalizer.

The structure of Fig. 10 represents a simplified and more compact form of the structure of Fig. 1 of the present application described in detail above, in that both branch arms are in effect consolidated into a single more complex arm.

In Fig. 10 a single "duplex" branch arm comprising outer conductor 208 and balanced two-wire line 210 is connected to the main coaxial line having outer conductor 200 and inner conductor 202. The upper end of line 210 is closed by conductor 209 which constitutes a loop inductively coupled to the main coaxial line 200, 202. The center point of loop 209 is also capacitatively coupled to conductor 202 by capacitor 206, as shown. The two-wire line 210 then constitutes one branch arm inductively coupled to the main coaxial line and the coaxial branch arm comprising the two conductors taken together as an inner conductor and the shield 208, as the outer conductor, constitutes the other branch arm capacitatively coupled to the main coaxial. This structure utilizes the ability of a shielded and balanced two-wire line to carry two independent modes simultaneously and depends for its operation upon maintaining the two-wire line in a balanced condition. One mode is the usual two-wire balanced line mode in which a balaced-to-ground source excites the two wires with voltages of equal and opposite polarity and the outer conductor serves only as a shield. The other mode is the coaxial mode in which equal and like-directed currents are simultaneously introduced on both wires of the two-wire line the outer conductor acting as the return path for both said equal and like-directed currents. As will be immediately recognized by those skilled in the art, this arrangement is similar in certain aspects to the time-honored practice of using a balanced two-wire line to prevent interference between balanced signal waves and unwanted "longitudinal" waves induced on the communication two-wire balanced circuit by the proximity of power lines or other interfering energy sources.

In this present application both types or modes of signal waves are wanted but it is essential that they be isolated from each other. The "unbalanced" mode will couple through capacitor 206 and the "uabalanced" currents will travel in phase toward both terminals A and B thus providing a parallel coupling. The "balanced" mode will couple inductively through the coupling loop 209 and currents will travel in opposite phase toward terminals A and B thus providing a series coupling. The two will be mutually independent as long as the necessary and obvious conditions of balance are maintained, as will be immediately apparent to those skilled in the art. Insulators 204 and 212 support their respective inner conductors symmetrically with respect to the outer conductors 200 and 208.

If both modes of the branch line 210, 208, are short circuited at the proper distance from the junction with the main coaxial line 200, 202 as shown in Fig. 11, the shorting member for the shield 208 being 216, and the shorting member for the balanced line 210 being conductive stub, post or cylinder 214, a band rejection filter or a delay equalizer is obtained which will have precisely the same electrical characteristics as corresponding devices in accordance with Fig. 3, described in detail above.

Figure 12:
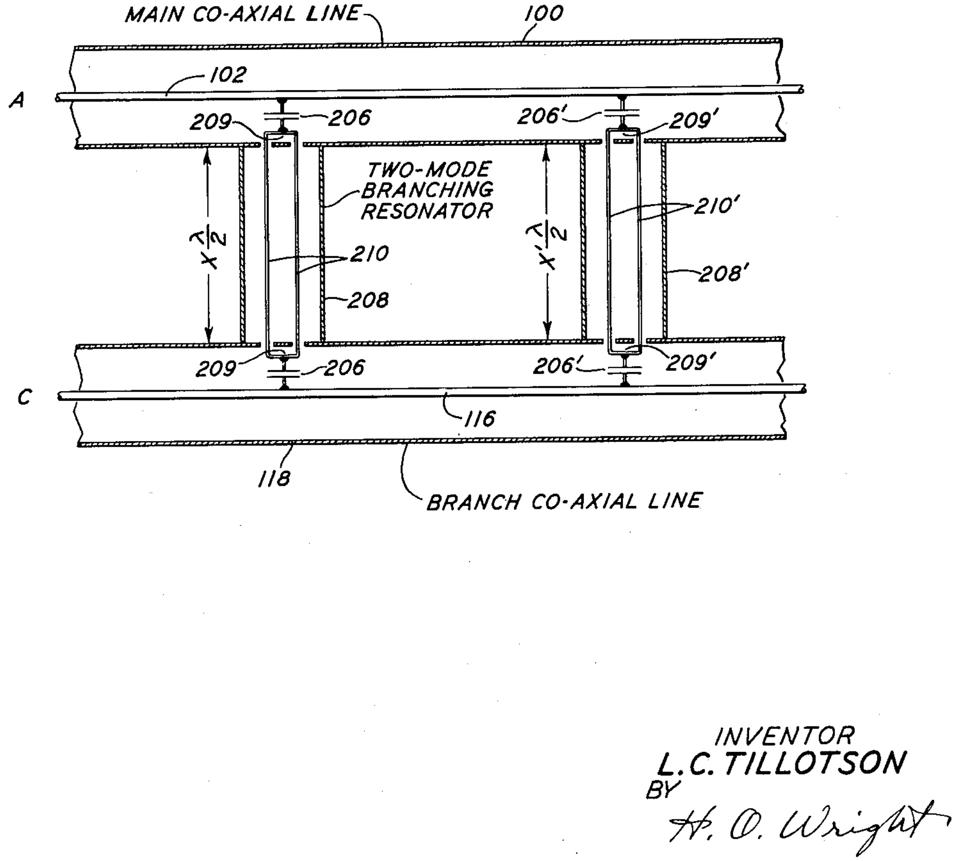
Fig. 12 shows in diagrammatic form an additional type of electromagnetic wave, coaxial constant resistance, pseudohybrid, filter of the invention.

The two-mode type of pseudohybrid can be employed to construct a constant resistance filter which is the full equivalent of the structure shown in Fig. 8, described in detail above. Two such structures are shown in Fig. 12 to the left and right thereof, respectively. In Fig. 12, considering first the left half of the figure, main coaxial line 100, 102 is connected to branch coaxial line 118, 116 by the two-mode branching resonator 208, 210, a pseudohybrid junction being effected at each end of resonator 208, 210, by means of inductive coupling loops 209 and capacitative coupling capacitors 206.

In view of the above detailed descriptions of Figs. 8 to 11, inclusive, it will be at once apparent to those skilled in the art that the structure, comprising arm 208, 210, and associated elements 206 and 209 interconnecting coaxial lines 100, 102 and 118, 116, of Fig. 12 is a substantially equivalent electrical form of the structure comprising arms 104, 106 and 112, 114 and associated elements 105, 107, 108, and 110, of Fig. 8. It is also apparent that a broader band of frequencies can be branched from main coaxial line 100, 102 to branch coaxial line 118, 116 by using additional branching resonators of the same type as 208, 210 and coupling members like 206, 209, such an additional resonator 208', 210' being, for example, indicated at the right of Fig. 12, with coupling members 206', 209', the added resonators being tuned to pass different bands of frequencies, respectively. Thus, resonator 208', 210' is indicated as having a slightly different length $$x'\frac{\lambda}{2}$$

Since each such structure is of the constant resistance type, there will be no interaction between them, and their respective coupling points, that is, their spacings, along the main and branch lines can be chosen solely from the standpoint of mechanical convenience. Obviously, if their respective bands are suitably spaced in frequency they will merge into a single frequency band the width of which will be the sum of the individual frequency band widths. Alternatively, two or more bands displaced substantially in frequency can be transmitted from the main to branch coaxial line and subsequently separated by additional filtering structures, should more than one intelligence transmission channel be desired on the branch coaxial transmission line.

Numerous and varied other arrangements within the spirit and scope of the principles of the present invention will readily occur to those skilled in the art, the above-described structures being illustrative only and by no means exhaustively covering all possible or even all immediately apparent arrangements in accordance with said principles.

What is claimed is:

1. In an electromagnetic wave transmission system, a main coaxial line, a branch coaxial line, a two-wire branch line, a discrete capacitor interconnecting the center conductor of said coaxial branch line and a discrete point on the inner conductor of said main coaxial line, a conductor joining the near ends of said two-wire branch line and inductively coupling said two-wire branch line to the center conductor of said main coaxial line with substantially equal inductive couplings of like directions on opposite sides of said discrete point, whereby said two-wire branch line and said branch coaxial line are isolated from each other by electrical balance, and means shorting the outer end of said branch coaxial line and of said two-wire branch line at distances of substantially one-quarter wavelength and one-half wavelength, respectively, of a predetermined frequency within the range of frequencies to be transmitted along said main coaxial line.

2. A transducer for high frequency electromagnetic wave energy comprising a first section of coaxial line, a second section of coaxial line, a discrete capacitor, one terminal of said capacitor connecting to the center conductor of said second section of coaxial line, the other terminal of said capacitor connecting to a particular point on the center conductor of said first section of said coaxial line intermediate the ends of said first section of coaxial line, said second section of coaxial line being short-circuited at a distance from said first section of coaxial line of substantially one-quarter wavelength of the median operating frequency and a third section of parallel conductor line, said third section of line being inductively coupled by substantially equal, like directed inductive couplings to said center conductor of said first section of coaxial line, situated symmetrically about said particular point, said parallel conductor line being short-circuited at a distance from said first section of coaxial line of substantially one-half wavelength of the median operating frequency.

3. A frequency selective, high frequency electromagnetic wave transmission circuit which includes a first section of coaxial line, a second section of coaxial line short-circuited at one end, a discrete capacitor one terminal connecting to the free end of the center conductor of said second section of coaxial line, the other terminal of said capacitor connecting to a particular point on the inner conductor of said first section of coaxial line, and a section of parallel conductor line short-circuited at one end and inductively coupled at the other end to the inner conductor of said first section of coaxial line by substantially equal, like directed, inductive couplings on each side of said particular point.

4. A frequency selective, high frequency electromagnetic wave transmission circuit for use in a predetermined range of frequencies which circuit includes a section of coaxial line, and two high frequency electromagnetic wave resonators, both having their respective principal resonant frequencies within said frequency range, a discrete capacitor interconnecting one of said resonators and a discrete point on the center conductor of said section of coaxial line, the other of said resonators being inductively coupled to the center conductor of said section of coaxial line by substantially equal, like directed, inductive couplings on each side of said discrete point, whereby said resonators are isolated from each other by electrical balance.

References Cited in the file of this patent

UNITED STATES PATENTS

| | | |
|---|---|---|
| 2,169,306 | Tunick | Aug. 15, 1939 |
| 2,423,416 | Sontheimer et al. | July 1, 1947 |
| 2,454,062 | Holman et al. | Nov. 16, 1948 |
| 2,498,073 | Edson et al. | Feb. 21, 1950 |
| 2,523,791 | Vahle et al. | Sept. 26, 1950 |
| 2,536,504 | Kihn | Jan. 2, 1951 |
| 2,567,235 | Rabuteau | Sept. 11, 1951 |
| 2,616,951 | Moreno | Nov. 4, 1952 |
| 2,624,780 | Byrne | Jan. 6, 1953 |